United States Patent [19]

Kanatani et al.

[11] Patent Number: 4,662,203
[45] Date of Patent: May 5, 1987

[54] MULTISTAGE WIRE DRAWING APPARATUS

[75] Inventors: Tadayuki Kanatani, Fujisawa; Katunori Nomura; Hirotaka Uchida, both of Yokohama, all of Japan

[73] Assignee: Kabushiki Kaisha Toshiba, Kawasaki, Japan

[21] Appl. No.: 776,045

[22] Filed: Sep. 13, 1985

[30] Foreign Application Priority Data

Sep. 20, 1984 [JP] Japan .................. 59-197221

[51] Int. Cl.$^4$ .................. B21C 1/04; B21C 1/12
[52] U.S. Cl. .................. 72/9; 72/282; 72/279; 72/288
[58] Field of Search ............. 72/9, 12, 17, 279, 282, 72/288, 291

[56] References Cited

U.S. PATENT DOCUMENTS 2,242,435  5/1941  Parvin et al. .................. 72/279
3,798,939  3/1974  Mertens et al. ................ 72/279

FOREIGN PATENT DOCUMENTS 142944   7/1980  German Democratic Rep. ... 72/279
144721  11/1980  German Democratic Rep. ... 72/279
53816    5/1981  Japan .......................... 72/286
53817    5/1981  Japan .......................... 72/279

Primary Examiner—Daniel C. Crane
Attorney, Agent, or Firm—Cushman, Darby & Cushman

[57] ABSTRACT

The multistage tandem wire drawing apparatus according to the present invention has a heating mechanism and wire drawing units (draw benches) arranged in tandem to correspond to the respective manufacturing stages of the work, and is characterized in that a tension of the work moving between the wire drawing units is measured. The measured tension and a predetermined reference tension are compared to calculate any deviation therebetween, and, by using a movable chuck speed of a predetermined wire drawing unit as a reference, movable chuck speeds of the other wire drawing units are controlled in accordance with the calculated tension deviation. According to the present invention, the wire drawing speeds of the wire drawing units are controlled in accordance with the tension of the work between the wire drawing units so that excessive tension does not act on the work, thereby preventing damage to the work while keeping the work taut.

3 Claims, 9 Drawing Figures

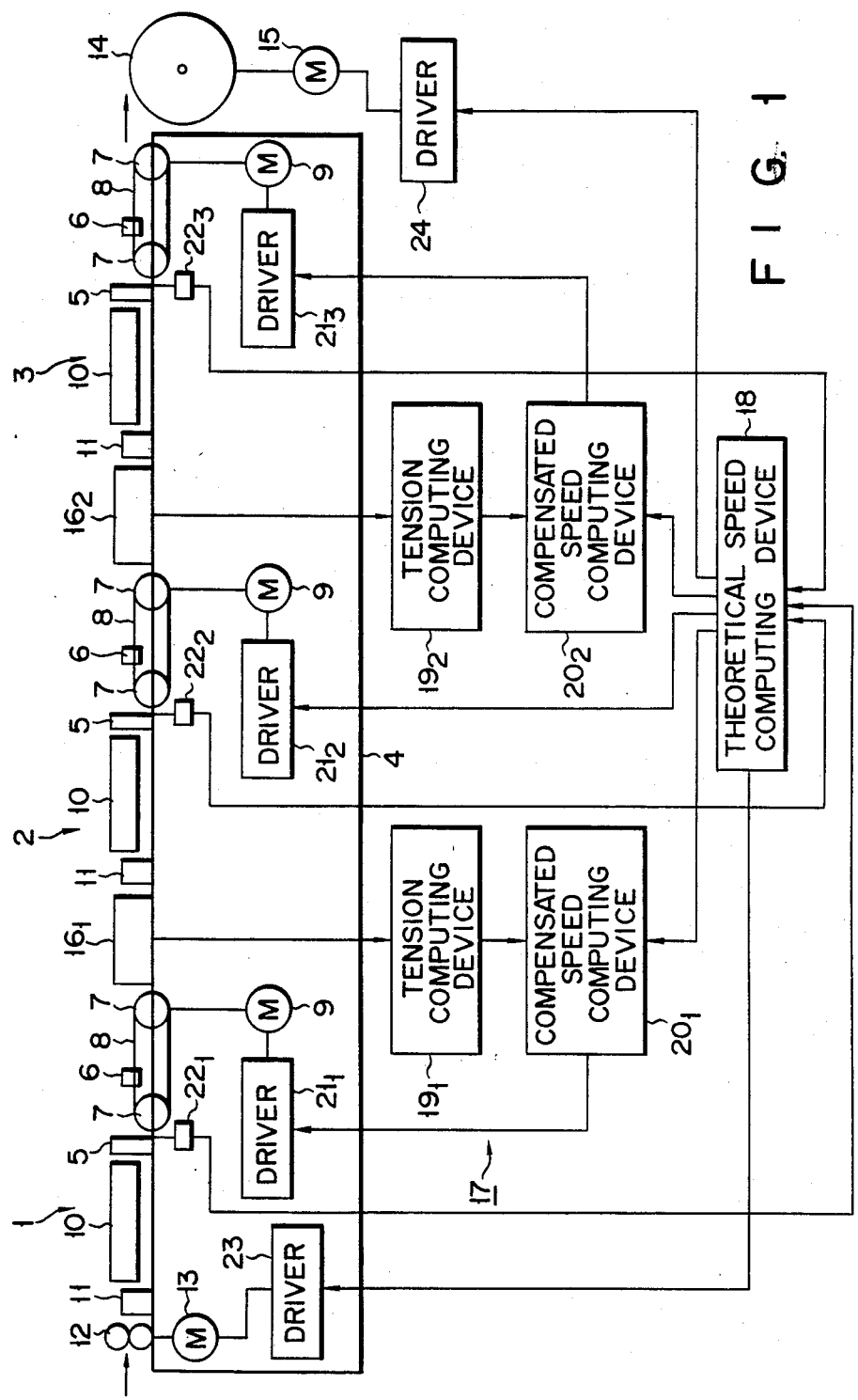

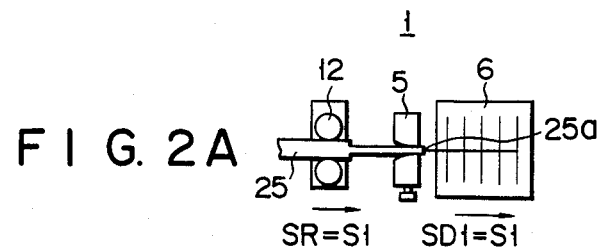
F I G. 2A
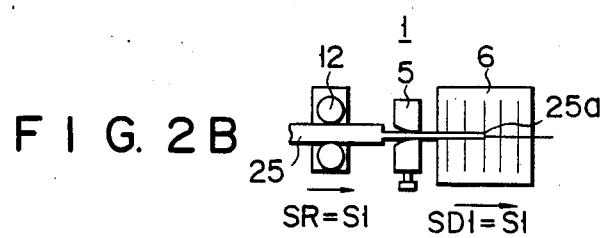
F I G. 2B
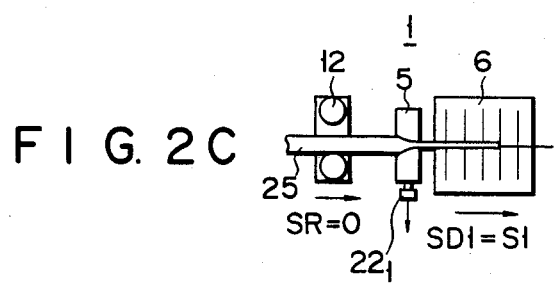
F I G. 2C
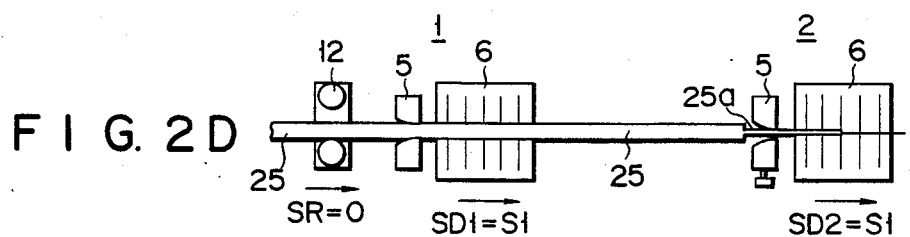
F I G. 2D

FIG. 2E
FIG. 2F
FIG. 2G

MULTISTAGE WIRE DRAWING APPARATUS

BACKGROUND OF THE INVENTION

1. Field of the Invention

The present invention relates to a multistage wire drawing apparatus wherein a plurality of wire drawing units are arranged in tandem to draw a high-melting metal, as a work, in a multistage manner.

2. Description of the Prior Art

When wire is manufactured from a high-melting metal such as tungsten or molybdenum, an ingot is prepared by powder metallurgy, and the ingot (work) is drawn by a unit to produce wire. At an early stage of manufacture, the ingot is considerably fragile and tends to break. For this reason, multistage wire drawing to sequentially decrease the wire diameter of the ingot is conventionally performed. In this case, the ingot must be heated by a heating means at each stage of manufacture, and an excessive tension must not act on the ingot.

A wire drawing unit termed a draw bench is used as a machine for drawing wire of a high-melting metal such as tungsten or molybdenum. In the draw bench, a work is inserted in a die, chucked and drawn by a movable chuck.

Conventionally, multistage wire drawing for sequentially decreasing the diameter of the work is performed by a wire drawing unit of the type described above and in the following manner. The work (ingot) is heated, inserted in and drawn by the die of a single wire drawing unit, and then wound by a winder. After the wire is wound, it is drawn from the winder and heated, and then inserted in and drawn by a die of another drawing unit having an aperture diameter different from that of the first die. Wire drawing is repeated in this manner. Wire drawing must be intermittently and independently performed a plurality of times in order to obtain a final wire diameter, resulting in a protracted and inefficient manufacturing process.

In order to overcome this drawback, a multistage wire drawing apparatus is proposed wherein a plurality of wire drawing units, each having a die of a different aperture diameter, are arranged in tandem, and a work is continuously fed and sequentially inserted in the die of each unit to thereby produce the required wire diameter through a single wire drawing.

In the multistage wire drawing apparatus of the above-mentioned type, a work must be moved between front and rear stage wire drawing units under constant tension so that any excessive tension does not act on the work, for the purpose of preventing damage to the work while it is taut. For this purpose, it is proposed to set the movable chuck speed (wire drawing speed) of the front stage wire drawing unit and the movable chuck speed (wire drawing speed) of the rear stage wire drawing unit in accordance with the ratio of the aperture diameters of the dies used in the front and rear stage wire drawing units.

Assuming that the aperture diameter of each die is constant, the ratio of the movable chuck speeds need not be changed once it is set. However, in practice, the aperture diameter of a die may increase due to friction between the aperture portion and the work, or, conversely, may decrease due to expansion of the die as a result of thermal conduction or friction from the heated work. Thus, the die aperture diameter is not constant but changes in practice. As a result, if the movable chuck speed of the rear wire drawing unit is set to be constant irrespective of change in the aperture diameter of each die, the chuck speed may be too fast or too slow in relation to the aperture diameter of the die. Then, the tension of the work between the wire drawing units is not constant but changes, resulting in damage or loosening of the wire, and thereby rendering wire drawing difficult.

It is conventionally difficult to adopt a multistage wire drawing apparatus due to the drawbacks described above.

SUMMARY OF THE INVENTION

The present invention has been made in consideration of the above situation, and has, as its object, to provide a multistage tandem wire drawing apparatus which can both keep the tension acting on the work constant, and which can facilitate high performance multistage wire drawing with ease.

According to the invention, there is provided a multistage wire drawing apparatus for drawing a work made of a high-melting metal in a multistage manner, comprising a plurality of wire drawing units arranged in series, each of said plurality of wire drawing units comprising a heating device, dies through which the work heated by said heating device is inserted and a chuck head which moves while drawing the work inserted in said dies, a plurality of tension measuring units provided between adjacent ones of said plurality of wire drawing units for measuring a tension of the work between adjacent wire drawing units, and a control unit for comparing the tension measured by said tension measuring unit with a predetermined reference tension, calculating a deviation between the measured tension and the reference tension, and controlling moving speed of the chuck head of the wire drawing unit in accordance with the calculated tension deviation and using as a reference the moving speed of the chuck head of a predetermined one of said wire drawing units.

BRIEF DESCRIPTION OF THE DRAWINGS

FIG. 1 is a diagram of a wire drawing apparatus according to an embodiment of the present invention;

FIGS. 2A to 2G are partial or overall plan views of the embodiment shown in FIG. 1, and correspond to the wire drawing steps.

DETAILED DESCRIPTION OF THE PREFERRED EMBODIMENTS

Figure 3:
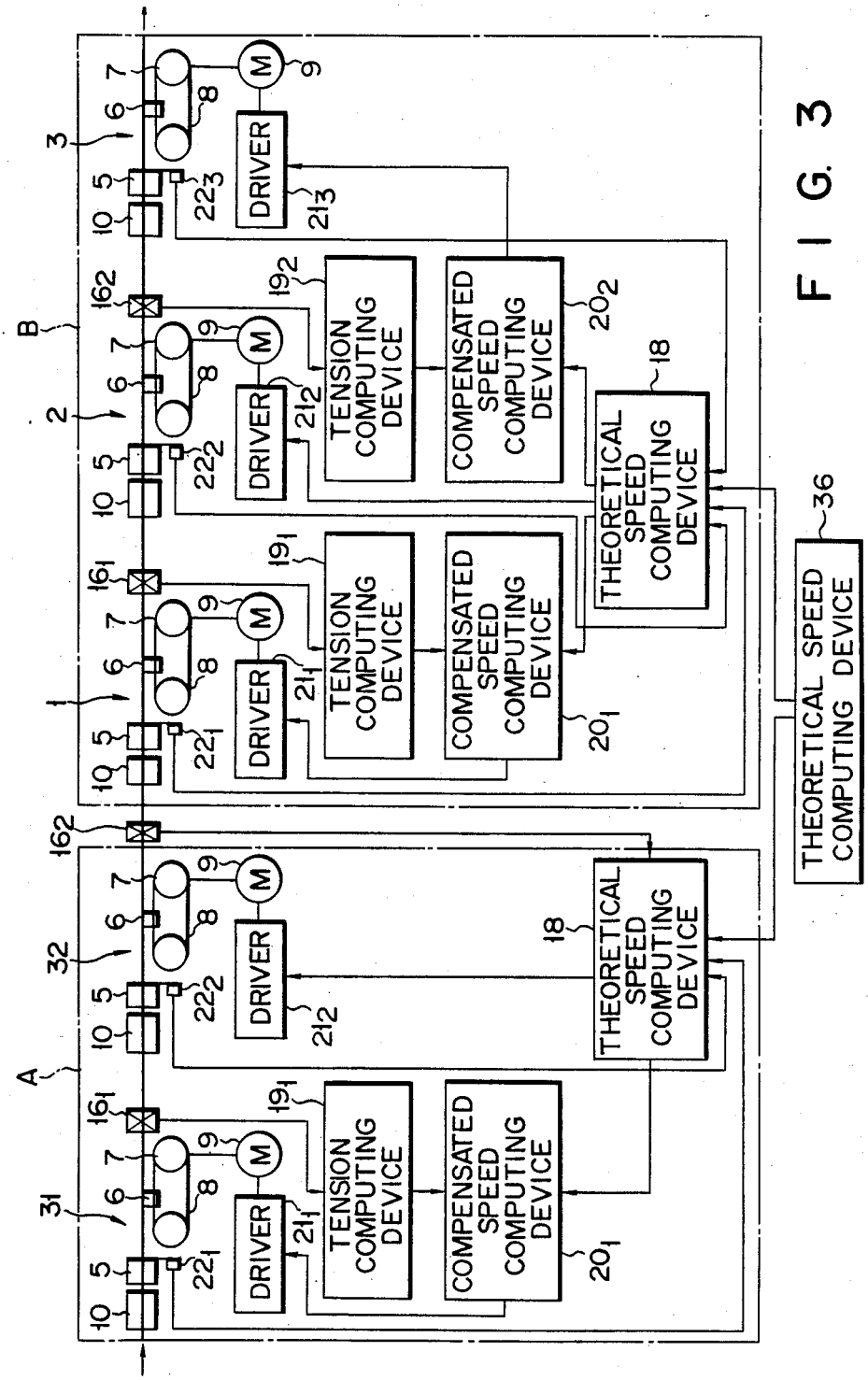
FIG. 3 is a diagram of a wire drawing apparatus according to another embodiment of the present invention.

The embodiments of the present invention will be described with reference to the accompanying drawings.

Figures 2E, 2F, 2G:
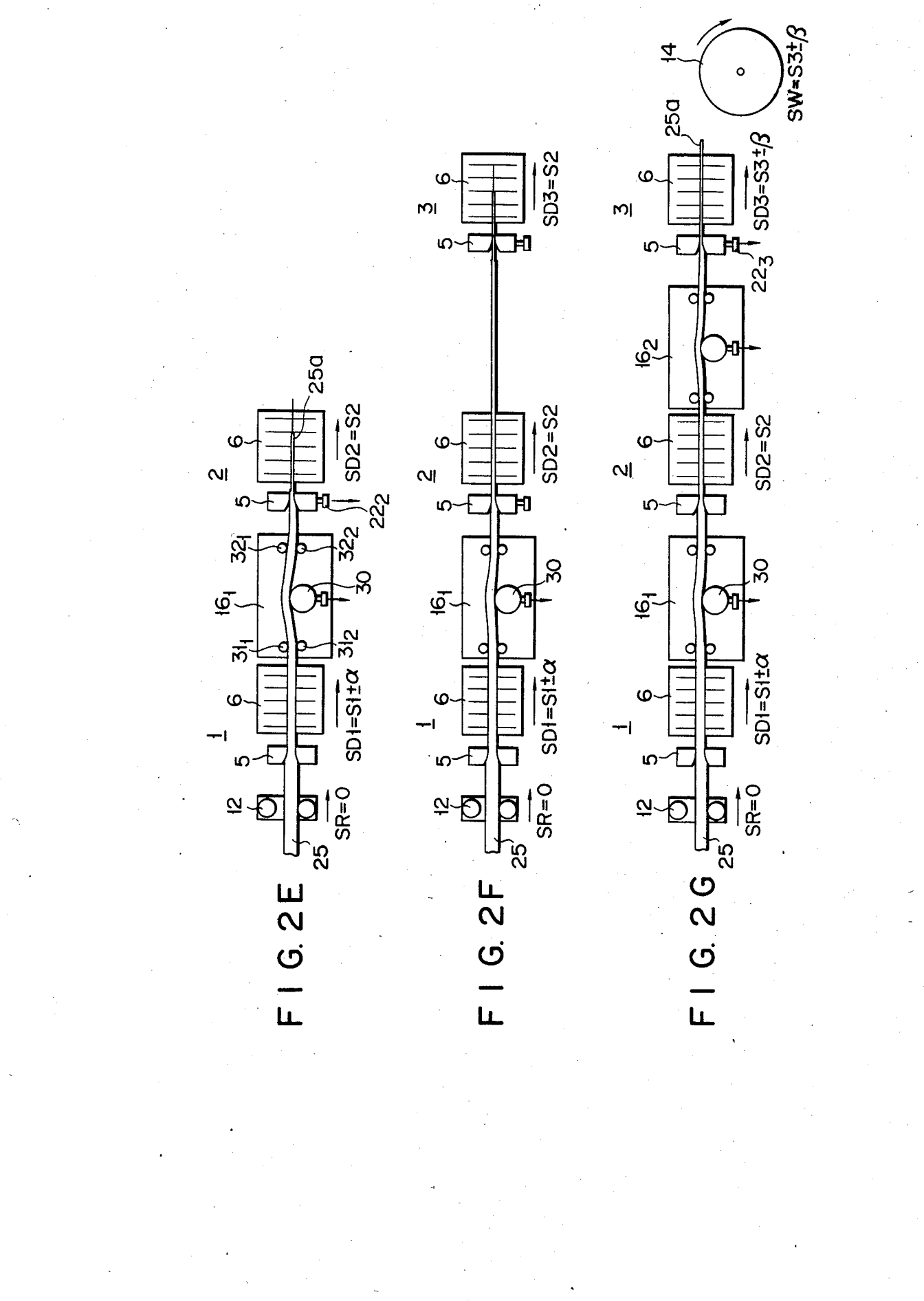

A wire drawing apparatus according to the first embodiment of the present invention will now be described with reference to FIGS. 1 and 2A to 2G.

In the first embodiment three wire drawing units are combined as one block. Three drawing units 1, 2 and 3 are arranged in tandem as front, middle and rear stage units along the moving direction of a work. Each of the units 1 to 3 comprises a die 5 and a movable chuck 6 arranged along the feed direction of the work on a unit table 4. As a moving mechanism for the chuck 6, for example, a chain 8 supported by sprockets 7 is arranged for each unit along the work feed direction, and the chuck 6 is mounted on the chain 8 as shown in FIG. 1. A motor 9 is provided for each unit for driving the chain 8 through the sprockets 7, such that the chuck 6 is moved together with the chain 8. The chuck 6 holds the work immediately behind the die 5, moves along a predetermined direction to draw the work a predetermined distance, and releases the work. Note that aperture diameters of the dies 5 of the respective units 1, 2 and 3 are sequentially decreased in the order named. A heating mechanism 10 for heating the work is provided in front of the die 5 of each of the units 1 to 3. A lubricant coater 11 is provided in front of each heating mechanism 10. Feed rollers 12 are provided in front of the front stage unit 1 for feeding the work. A winder 14 is provided behind the rear stage unit 3 for winding up the work already manufactured as wire. The feed rollers 12 and the winder 14 are driven by motors 13 and 15, respectively. In the first embodiment, as shown in FIGS. 2A to 2G, the moving (rotating) speeds of the chucks 6 of the units 1 to 3 are designated as SD1, SD2 and SD3, the rotating speed of the feed rollers 12 is designated as SR, and the rotating speed of the winder 14 is designated as SW.

As shown in FIG. 1, tension measuring unit $16_1$ is provided between the units 1 and 2 on the corresponding table 4, and a tension measuring unit $16_2$ is provided between the units 2 and 3 on the corresponding table 4. These units $16_1$ and $16_2$ measure the tension of the work moving between the units 1 and 2, and between the units 2 and 3, respectively. For example, tension is applied to a work 25 by a roller 30 as shown in FIGS. 2E to 2G, and variations in tension are measured.

A control unit 17 comprises a theoretical speed computing unit 18, tension computing units $19_1$ and $19_2$, compensated speed computing units $20_1$ and $20_2$, drive control units $21_1$, $21_2$ and $21_3$, wire drawing start detectors $22_1$, $22_2$ and $22_3$, and drive control units 23 and 24. The units $19_1$ and $19_2$ correspond to the units $16_1$ and $16_2$. These units $19_1$ and $19_2$ receive tension measurement signals from the units $16_1$ and $16_2$, compare them with a predetermined reference tension, calculate any deviation between the tension measurement signals and the reference tension and supply deviation signals to the units $19_1$ and $19_2$, respectively. The unit 18 calculates theoretical speeds (theoretical values) S1, S2 and S3 of the speeds SD1, SD2 and SD3 of the chucks 6 of the units 1 to 3, respectively, and outputs signals corresponding to the theoretical values S1, S2 and S3 to the units $20_1$ and $20_2$, and the unit $21_2$. The unit 18 further outputs control signals for controlling the rotating speeds of the rollers 12 and the winder 14 to the units 23 and 24. In calculating the theoretical values, the theoretical speeds S1 and S3 of the movable chuck speeds SD1 and SD3 of the front and rear stage units 1 and 3 are calculated with reference to the theoretical speed S2 of the movable chuck speed SD2 of the middle stage unit 2. The units $20_1$ and $20_2$ correspond to the units $19_1$ and $19_2$, respectively. These units $20_1$ and $20_2$ compare the tension deviation signals from the units $19_1$ and $19_2$ with the theoretical values from the unit 18 to calculate speed correction components $\pm\alpha$ and $\pm\beta$, and output speed signals $S1\pm\alpha$ and $S3+\pm\beta$ to the units $21_1$ and $21_3$. The units $21_1$, $21_2$ and $21_3$ correspond to the motors 9 of the units 1 to 3, respectively. The motors 9 of the units $21_1$, $21_2$ and $21_3$ are controlled by the speed signals from the units $20_1$, 18 and $20_2$, respectively. When rotation of the motors 9 is controlled, the moving speeds of the chucks 6 are controlled through the sprockets 7 and the chains 8. The detectors $22_1$, $22_2$ and $22_3$ correspond to the dies 5 of the units 1 to 3. These detectors $22_1$, $22_2$ and $22_3$ detect that the work is being passed through the dies 5 and that wire drawing is started, and, in consequence, produce a wire drawing start signal to the unit 18. The unit 23 controls the rotation of the motor 13 upon reception of a control signal from the unit 18, thereby controlling the rotation of the rollers 12. The unit 24 controls the rotation of the motor 15 upon reception of a control signal from the unit 18, thereby controlling the rotation of the winder 14.

Multistage wire drawing using the multistage wire drawing apparatus described above will now be described. The procedures of operation and control are summarized as follows. In the first embodiment, the movable chuck speeds (wire drawing speeds) SD1 and SD3 of the front and rear units 1 and 3 adjacent to the unit 2 are controlled with reference to the movable chuck speed (wire drawing speed) SD2 of the middle stage unit 2. For this purpose, the theoretical speeds S1 and S3 of the movable chuck speeds SD1 and SD3 of the units 1 and 3, respectively, are calculated with reference to the theoretical speed S2 of the movable chuck speed SD2 of the unit 2 by using the speed S2 and the die aperture diameters D1, D2 and D3 of the units 1 to 3. The theoretical speeds S1 and S3 are given by:

$$S1 = S2(D2/D1)^2$$

$$S3 = S2(D2/D3)^2$$

Speed correction components (correction values) corresponding to tension deviations of the work between the units 1 and 2, and between the units 2 and 3 are added to the theoretical values S1 and S3, respectively, so that the movable chuck speed SD1 is controlled to satisfy $$S1 \pm \alpha = S2(D2/D1)^2 \pm \alpha,$$

and the movable chuck speed SD3 is controlled to satisfy $$S3 \pm \beta = S2(D2/D3)^2 \pm \beta.$$

The multistage wire drawing control will be described in detail with reference to FIGS. 1 and 2A to 2G. The work (ingot) 25 made of a high-melting metal such as tungsten or molybdenum. A thin portion 25a (FIGS. 2A–2G) having a diameter smaller than the aperture diameter of the die 5 of the rear stage unit 3 is formed at a distal end of the ingot 25. In wire drawing, the movable chuck speed of the rear stage unit 3 of the two successive units is set equal to that of the front stage unit 1 before wire drawing starts at the rear stage unit 3 so as to prevent damage to the ingot 25. After wire drawing starts, the movable chuck speeds of the front and rear stage units 1 and 3 are controlled in a predetermined manner. Before wire drawing starts at the rear stage unit, the units $21_1$ and $21_2$ control the motors 9 of the units 1 and 2 by an instruction from the unit 18 so that both the movable chuck speeds SD1 and SD2 acquire the theoretical speed S1. In response to an instruction from the unit 18, the unit 23 sets the feed speed SR of the rollers 12 to S1 at the same speed as the movable chuck speed SD1 or S1 of the front stage unit 1. First, the ingot 25 is inserted between the pair of feed rollers 12 and fed thereby at the feed speed S1. After a lubricant is coated by the coater 11 of the front stage unit 1, the ingot 25 is heated by the mechanism 10 (FIG. 1). The ingot 25 is inserted in the die 5 of the unit 1, held by the chuck 6, and drawn from the die 5, having a smaller aperture diameter than the roller 12, (FIGS. 2A, 2B and 2C) upon movement of the chuck 6 at the theoretical speed $S1=S2(D2/D1)^2$. The diameter of the ingot 25 is D1 when the theoretical speed is calculated. When the work 25 is drawn from the die 5 of the unit 1, the detector $22_1$ outputs a signal indicating the start of wire drawing of the unit 1 to the unit 18. Then, the rotation of the rollers 12 is stopped by an instruction from the unit 18, and the thin portion 25a of the work 25 is passed through the unit $16_1$. Thereafter, the work 25 is passed through the coater 11, the mechanism 10 of the unit 2 and the die 5 of the unit 2, and the thin portion 25a is held by the chuck 6 of the unit 2. At this time, since wire drawing has not yet started at the middle unit 2, tension measurement by the unit $16_1$ is not performed, and the speed SD2 of the chuck 6 of the unit 2 remains set at S1, which is the same as that of the front stage unit 1 (FIG. 2D). Upon movement of the chuck 6 of the unit 2, the work 25 is drawn from the die 5, having an aperture diameter of D2, of the unit 2, and wire drawing begins at the unit 2. Note that the work 25 can be protected from damage by setting the movable chuck speed SD2 of the middle unit 2 at the same speed as the movable chuck speed SD1 of the front stage unit 2 in the manner described above and before wire drawing begins at the unit 2. In contrast, if the speed SD2 of the unit 2 is faster than the speed SD1 of the unit 1, the thin portion 25a of the work 25 is cut owing to undue tension force, while, conversely, if the speed SD2 of the unit 2 is slower than the speed SD1 of the unit 1, the thin portion 25a of the work 25 is bent or damaged. When the detector $22_2$ outputs a signal indicating the start of wire drawing at the unit 2 to the unit 18, the unit $21_2$ controls the motor 9 of the unit 2 so that the speed SD2 of the chuck 6 of the unit 2 is increased from the previously set speed S1 to the original theoretical speed S2. The diameter D2 of the work 25 is used to calculate the theoretical speed S2.

When wire drawing begins at the unit 2, the unit $16_1$ measures the tension of the work 25 between the units 1 and 2 and supplies a signal to the unit $19_1$. This tension measurement is performed in the following manner. Two pairs of support rollers $31_1$ and $31_2$ and $32_1$ and $32_2$ are arranged at the inlet and outlet port sides of the unit $16_1$, respectively. The work 25 is inserted between the rollers $31_1$ and $31_2$ and the rollers $32_1$ and $32_2$. The roller 30, movable along a direction perpendicular to the work 25, is abutted against the work 25, and the reaction force of the abutment is measured. The unit $19_1$ calculates the deviation between the measured tension and a predetermined reference tension and outputs the obtained deviation to the unit $20_1$. The unit $20_1$ calculates a correction component $\pm\alpha$ from the tension deviation and the theoretical speed S1 from the unit 18 and supplies a speed signal $SD1=S1\pm\alpha$ to the unit $21_1$. Then, the unit $21_1$ controls the motor 9 of the unit 1 so that the speed SD1 of the chuck 6 of the unit 1 becomes $S1\pm\alpha$ (FIG. 2E). As a result, even if the aperture diameters D1 and D2 of the dies 5 of the units 1 and 2 vary, no excessive tension is applied to the work 25 moving between the units 1 and 2, and the work 25 can be moved under an appropriate tension without damage while being kept taut.

The work 25 is then passed through the unit $16_2$ and, thereafter, through the coater 11, mechanism 10 and the die 5 of the unit 3, and the thin portion 25a of the work 25 is held by the chuck 6 of the unit 3. In this state, wire drawing by the unit 3 has not yet started, the movable chuck speed SD3 of the unit 3 is set at S2, which is the same as that of the unit 2, and tension measurement by the unit $16_2$ has not yet been performed (FIG. 2E). When the work 25 is drawn from the die 5, having the aperture diameter of D3, of the unit 3 upon movement of the chuck 6 of the unit 3, the detector $22_3$ detects the start of wire drawing at the unit 3 and supplies a wire drawing start signal to the unit 18. Then, upon instruction from the unit 18, the unit $21_3$ controls the motor 9 of the unit 3 so that the speed SD3 of the chuck 6 of the unit 3 is increased from the speed S2 to the original speed $S3=S2(D2/D3)^2$. The diameter D3 of the work 25 is used to calculate the theoretical speed S3.

After wire drawing by the unit 3 has begun, the unit $16_2$ measures the tension of the work 25 between the units 2 and 3 and outputs a signal representing the measured signal to the unit $19_2$. The unit $19_2$ calculates the deviation between the measured tension and a reference tension and outputs a signal representing the deviation to the unit $20_2$. The unit $20_2$ calculates a correction component $\pm\beta$ from the tension deviation from the unit $19_2$ and the theoretical speed S3 from the unit 18 to obtain a speed signal $S3\pm\beta$, and outputs the speed signal $SD3=S3\pm\beta$ to the unit $21_3$. Then, the unit $21_3$ controls the motor 9 of the unit 3 so that the speed SD3 of the chuck 6 of the unit 3 is set at $S3\pm\beta$ (FIG. 2G). As a result, even if the aperture diameters D2 and D3 of the dies 5 of the units 2 and 3 vary, no excessive tension is applied to the work 25 moving between the units 2 and 3, and the work 25 can be moved under an appropriate tension free from damage while being kept taut. The work 25, drawn by the units 1 to 3 in three stages in the manner described above, is then wound by the winder 14. Prior to the winding action, however, an instruction signal is supplied from the unit 18 to the unit 24 and the winding speed SW of the winder 14 is controlled so as to be equal to the movable chuck speed $SD3=S3\pm\beta$ of the unit 3.

In the first embodiment, three wire drawing units 1 to 3 are combined as one block. However, the present invention is not limited to this particular embodiment, and two, or four or more wire drawing units can be combined as one block. In these cases, using the wire drawing speed of any one unit of the block as a reference, the wire drawing speeds of the other units can be controlled.

FIG. 3 shows a second embodiment of the present invention. According to the second embodiment, a block A comprising two, i.e., front and rear wire drawing units 31 and 32 is arranged at the front stage of a block B comprising the three wire drawing units 1 to 3 of the first embodiment, and the wire drawing speed between the blocks A and B is controlled. In the block A, the movable chuck speed of the front stage unit 31 is controlled with reference to the movable chuck speed of the rear stage wire drawing unit 32. The movable chuck speed of the rear unit of the block A is adopted as the wire drawing speed of the block A, and the wire drawing speed of the block B is controlled by a unit 36 provided between the blocks A and B with reference to the wire drawing speed of the block A.

As has been described above, according to the tandem multistage wire drawing apparatus of the present invention, using a movable chuck speed of any one of a plurality of wire drawing units arranged in tandem, the movable chuck speeds of the other wire drawing units can be controlled. Therefore, wire drawing can be performed under good conditions without application of excessive tension to the work between the wire drawing units, so that high performance wire drawing can be effected without fear of damaging the work.

What is claimed is:

1. An apparatus for hot drawing of a work made of sintered metal powder having a high melting point, comprising:

first, second and third drawing means arranged in series in order, each of said drawing means including a heating device, a die through which said work heated by said heating device passes, and a chuck head means for moving said work along a direction in which said work is drawn;

first and second tension measuring means, said first tension measuring means, arranged between said first drawing means and said second drawing means, for measuring a tension therebetween, and said second tension measuring means, arranged between said second drawing means and said third drawing means, for measuring a tension therebetween;

first comparator means coupled to said first tension measuring means, for comparing the tension measured by said first measuring means with a reference tension to determine a deviation of the tension measured by said first measuring means from said reference tension;

second comparator means, coupled to said second tension measuring means, for comparing the tension measured by said second measuring means with said reference tension to determine a deviation of the tension measured by said second measuring means from said reference tension;

means for calculating theoretical speeds of said chuck head means in said first and third drawing means, using as a reference, a theoretical speed of said chuck of said chuck head means in said second drawing means; and first drive controlling means, coupled to said calculating means, said first comparator means and said chuck head means of said first drawing means, for controlling a speed of said chuck head means in said first drawing means according to a comparison of the deviation determined by said first comparator means and the theoretical speed of said chuck head means of said first drawing means calcualted by said calculating means;

second drive controlling means, coupled to said calculating means, said second comparator means and said chuck head means of said third drawing means, for controlling a speed of said chuck head means in said third drawing means according to a comparison of the deviation determined by said second comparator means and the theoretical speed of said chuck head means of said third drawing means calculated by said calculating means.

2. The apparatus for hot drawing of the work, according to claim 1, wherein:

said calculating means calculates the theoretical speed of said chuck head means in said first drawing means according to an equation:

$$S1 = S2(D2/D1)2$$

wherein S1 is the theoretical speed of said chuck head means in said first drawing means and S2 is the theoretical speed of said chuck head means in said second drawing means;

wherein D1 and D2 are diameters of apertures in the dies in said first and second drawing means, respectively;

wherein said calculating means also calculates the theoretical speed of said chuck head means in said third drawing means according to an equation:

$$S3 = S2(D2/D3)2$$

wherein D3 is a diameter of an aperture of the die in said third drawing means.

3. The apparatus for hot drawing of the work, according to claim 2, wherein:

said first drive controlling means controls the speed of said chuck head means of said first drawing means according to an equation:

$$SD1 = S1 \pm \alpha$$

wherein $\alpha$ is a speed correction component for the speed of said chuck head means of said first drawing means determined by the theoretical speed S1 of said chuck head means in said first drawing means and a deviation determined by said first comparator means; and wherein said second drive controlling means controls the speed of said chuck head means of said third drawing means according to an equation:

$$SD3 = S3 \pm \beta$$

wherein $\beta$ is a speed correction component for the speed of said chuck head means of said third drawing means determined by the theoretical speed S3 of said chuck head means in said third drawing means and a deviation determined by said second comparator means.

* * * * *